(12) United States Patent
Doyle et al.

(10) Patent No.: US 12,554,274 B2
(45) Date of Patent: Feb. 17, 2026

(54) FUEL LEVEL CONTROL SYSTEM AND METHOD

(71) Applicant: American Honda Motor Co., Inc., Torrance, CA (US)

(72) Inventors: Timothy J. Doyle, Stokesdale, NC (US); William E. Gorgen, Naples, FL (US); Paul R. Woodcock, Phoenix, AZ (US)

(73) Assignee: American Honda Motor Co., Inc., Torrance, CA (US)

( * ) Notice: Subject to any disclaimer, the term of this patent is extended or adjusted under 35 U.S.C. 154(b) by 245 days.

(21) Appl. No.: 18/461,327

(22) Filed: Sep. 5, 2023

(65) Prior Publication Data

US 2025/0076902 A1 Mar. 6, 2025

(51) Int. Cl.
*G05D 9/12* (2006.01)
*B64C 17/10* (2006.01)
*B64D 37/04* (2006.01)
*B64D 37/14* (2006.01)

(52) U.S. Cl.
CPC .............. *G05D 9/12* (2013.01); *B64D 37/04* (2013.01); *B64D 37/14* (2013.01); *B64C 17/10* (2013.01)

(58) Field of Classification Search
CPC ........ B64C 17/10; B64D 37/00; B64D 37/02; B64D 37/04; B64D 37/06; B64D 37/08; B64D 37/14; B64D 37/16; B64D 37/20; B64D 37/22; B64D 37/24; B64D 37/26; B64D 37/28; G05D 9/12
USPC ....................................................... 244/135
See application file for complete search history.

(56) References Cited

U.S. PATENT DOCUMENTS

| | | | |
|---|---|---|---|
| 2,823,880 A * | 2/1958 | Bergeson | B64C 17/10 137/98 |
| 2,926,688 A * | 3/1960 | Muma | B64D 37/20 137/263 |
| 2,969,803 A | 1/1961 | Mosher | |
| 3,419,233 A | 12/1968 | Wotton | |
| 4,913,380 A | 4/1990 | Vardaman et al. | |
| 5,321,945 A * | 6/1994 | Bell | F02C 7/22 60/734 |
| 5,660,358 A * | 8/1997 | Grafwallner | B64D 37/14 137/565.17 |

(Continued)

FOREIGN PATENT DOCUMENTS

| CN | 111056021 B | 6/2021 |
|---|---|---|
| CN | 112937838 A | 6/2021 |

*Primary Examiner* — Joshua E Rodden
(74) *Attorney, Agent, or Firm* — Mark E. Duell; Rankin, Hill & Clark LLP

(57) ABSTRACT

A fuel level control system and method for an aircraft to passively manage fuel center of gravity during consumption includes an upper tank, a lower tank disposed below the upper tank, a fuel transfer line connecting the tanks, an upper fuel transfer line outlet in the lower tank and a lower fuel transfer line outlet in the lower tank. The outlet outlets are in fluid communication with the upper tank via the fuel transfer line. An upper line outlet valve is associated with the upper fuel transfer line outlet for opening and closing the upper fuel transfer line outlet. A lower line outlet valve is associated with the lower fuel transfer line outlet for opening and closing the lower fuel transfer line outlet. A control shutoff valve is disposed on the fuel transfer line for selectively limiting flow through the fuel transfer line.

19 Claims, 5 Drawing Sheets

(56) References Cited

U.S. PATENT DOCUMENTS

| | | | |
|---|---|---|---|
| 5,975,464 A | 11/1999 | Rutan | |
| 6,913,228 B2 | 7/2005 | Lee et al. | |
| 7,073,751 B1 * | 7/2006 | Tighe | B64D 37/00 244/135 C |
| 7,337,795 B2 * | 3/2008 | Johnson | B64C 17/10 244/135 C |
| 7,357,149 B2 | 4/2008 | Howe | |
| 8,226,040 B2 | 7/2012 | Neto | |
| 9,038,955 B2 * | 5/2015 | Goto | B64D 37/28 137/391 |
| 10,518,872 B2 | 12/2019 | Ribarov et al. | |
| 10,710,737 B2 | 7/2020 | James et al. | |
| 11,332,257 B2 | 5/2022 | Drancea et al. | |
| 11,724,799 B2 * | 8/2023 | Rawdon | B64C 17/10 244/135 C |
| 2005/0051666 A1 * | 3/2005 | Lee | B64C 17/10 244/10 |
| 2006/0278761 A1 * | 12/2006 | Cutler | B64D 39/00 244/135 A |
| 2009/0088911 A1 * | 4/2009 | Paillard | B64C 17/10 701/4 |
| 2011/0147530 A1 | 6/2011 | Rahman et al. | |
| 2014/0027575 A1 * | 1/2014 | Goto | B64D 37/28 244/135 C |
| 2015/0151845 A1 * | 6/2015 | Jones | B64D 37/32 244/135 R |
| 2016/0375985 A1 * | 12/2016 | Ribarov | B64C 17/10 244/135 C |
| 2019/0002087 A1 | 1/2019 | Mills et al. | |

* cited by examiner

FUEL LEVEL CONTROL SYSTEM AND METHOD

BACKGROUND

The fore-aft position of the center of mass of an aircraft needs to be maintained within prescribed limits for purposes of achieving adequate flight stability and acceptable pilot control forces. The center of mass is affected by the location of passengers, cargo, and fuel on the aircraft. Generally, many aircraft designs incorporate multiple fuel tanks on the aircraft so that the fuel weight can be distributed to achieve the desired location of the center of mass. Distributing the fuel between these various tanks has heretofore been accomplished by the use of pumps and valves and is generally managed by the pilot or by onboard computers that can move the fuel between the various tanks to maintain the appropriate center of gravity position of the aircraft as fuel is consumed by the aircraft's engine or engines during flight.

BRIEF DESCRIPTION

According to one aspect, a fuel level control system includes one or more pipes or lines connecting two or more fuel tanks on the aircraft. The tanks can be arranged so that one tank is higher than the other tank and the higher tank is located at a different fore-aft position from the lower tank. The lines connecting the tanks can be arranged in the tanks to locate two or more discharges at different levels or heights within the tanks. Fuel from the higher tank is transferred to a lower tank by gravity flow through the lines. The discharge ends of the lines can incorporate shutoff valves (e.g., float actuated shutoff valves) to allow fuel flow from the higher tank to the lower tank when the fuel level in the lower tank is below the level of the actuation point of the valve and to prevent flow when the fluid level in the lower tank is above the actuation point of the valve. Various branches of the lines can incorporate one or more in-line shutoff valves to allow flow through only those branches where the shutoff valves are in an open state or where no shutoff valve is deployed. By selecting which branch is used for fuel transfer, the fuel transfer from the upper tank to the lower tank can be scheduled to occur earlier or later in the fuel consumption sequence thereby maintaining a desired fore or aft center of gravity location of the fuel.

According to another aspect, a fuel level control system for an aircraft includes an upper tank for storing fuel and a lower tank for storing fuel, wherein the lower tank is disposed below the upper tank. The fuel level control system further includes a fuel transfer line connecting the upper tank to the lower tank. Additionally, the control system includes an upper fuel transfer line outlet in the lower tank and a lower fuel transfer line outlet in the lower tank. The upper fuel transfer line outlet and the lower fuel transfer line outlet are in fluid communication with the upper tank via the fuel transfer line. An upper line outlet valve is associated with the upper fuel transfer line outlet for opening and closing the upper fuel transfer line outlet. A lower line outlet valve is associated with the lower fuel transfer line outlet for opening and closing the lower fuel transfer line outlet. The fuel level control system further includes a control shutoff valve disposed on the fuel transfer line for selectively limiting flow through the fuel transfer line.

According to a further aspect, an aircraft fuel level control system includes an upper fuel tank and a lower fuel tank disposed below the upper fuel tank. The aircraft fuel level control system further includes a fuel transfer line fluidly connecting the upper fuel tank and the lower fuel tank. The fuel transfer line has an upper fuel transfer line outlet in the lower fuel tank with an upper line outlet valve for opening and closing the upper fuel transfer line outlet and has a lower fuel transfer line outlet in the lower fuel tank with a lower line outlet valve for opening and closing the lower fuel transfer line outlet. The aircraft fuel level control system further includes a control shutoff valve fluidly disposed between the upper fuel transfer line outlet and the upper fuel tank.

According to still another aspect, a fuel level control method for an aircraft includes providing an upper tank for storing fuel and providing a lower tank for storing fuel that is disposed below the upper tank. The lower tank is fluidly connected to the upper tank by a fuel transfer line. The method further includes directing fuel from the upper tank to the lower tank through the fuel transfer line via an upper fuel transfer line outlet having an upper line outlet valve, and directing fuel from the upper tank to the lower tank through the fuel transfer line via a lower fuel transfer line outlet having a lower line outlet valve. The method still further includes selectively closing a control shutoff valve fluidly disposed on the fuel transfer line to limit flow through the fuel transfer line.

DETAILED DESCRIPTION

It should, of course, be understood that the description and drawings herein are merely illustrated and that various modifications and changes can be made in the structures disclosed without departing from the present disclosure. Spatially relative terms may be used to describe an element and/or features relationship to another element(s) and/or feature(s) as, for example, illustrated in the figures. Moreover, any term of degree used herein, such as "substantially" and "approximately" means a reasonable amount of deviation of the modified word is contemplated such that the end result is not significantly changed.

Figure 1:
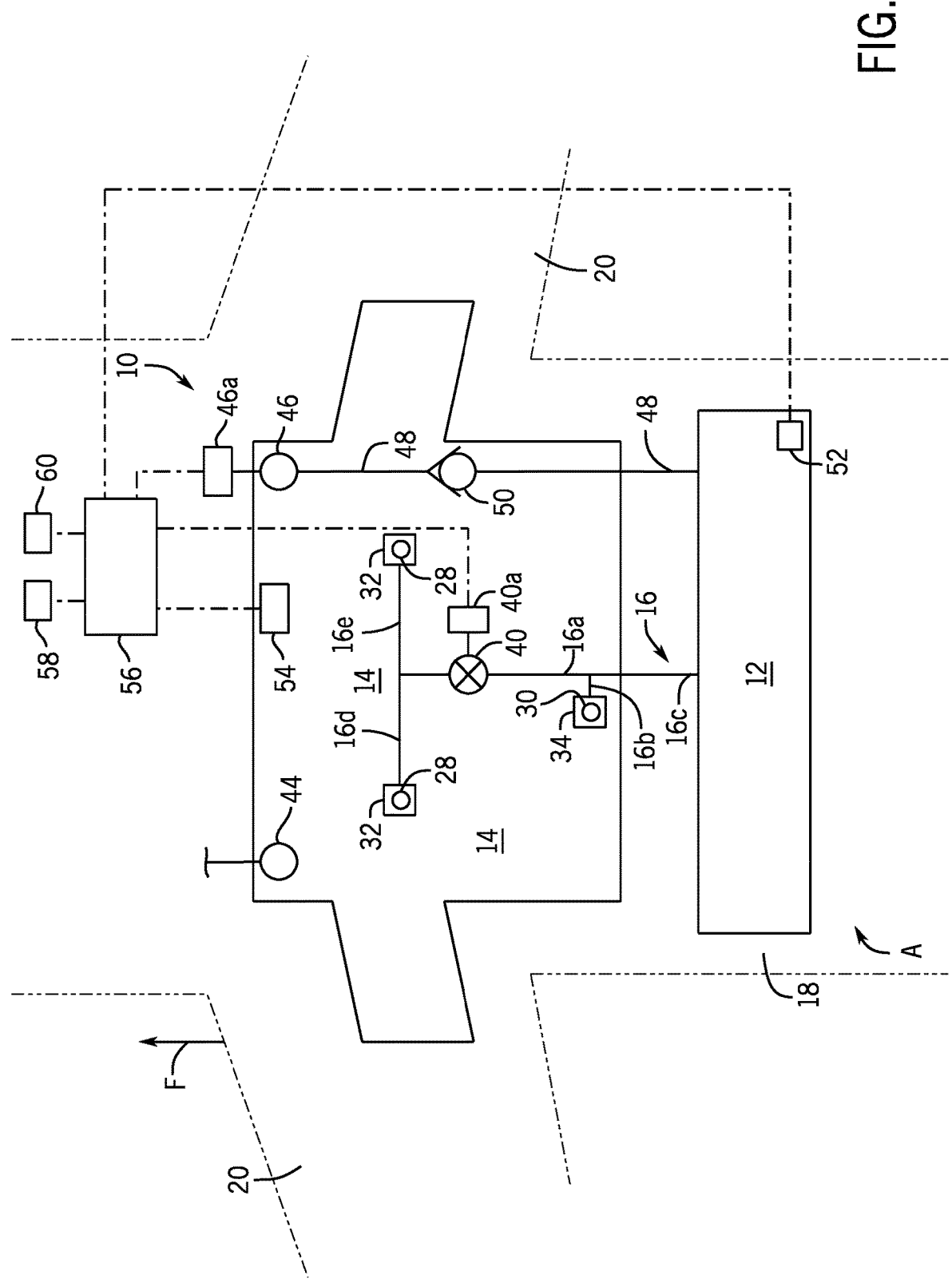
FIG. 1 is a schematic top view of an aircraft fuel level control system for an aircraft according to one aspect of the present disclosure.
Figure 2:
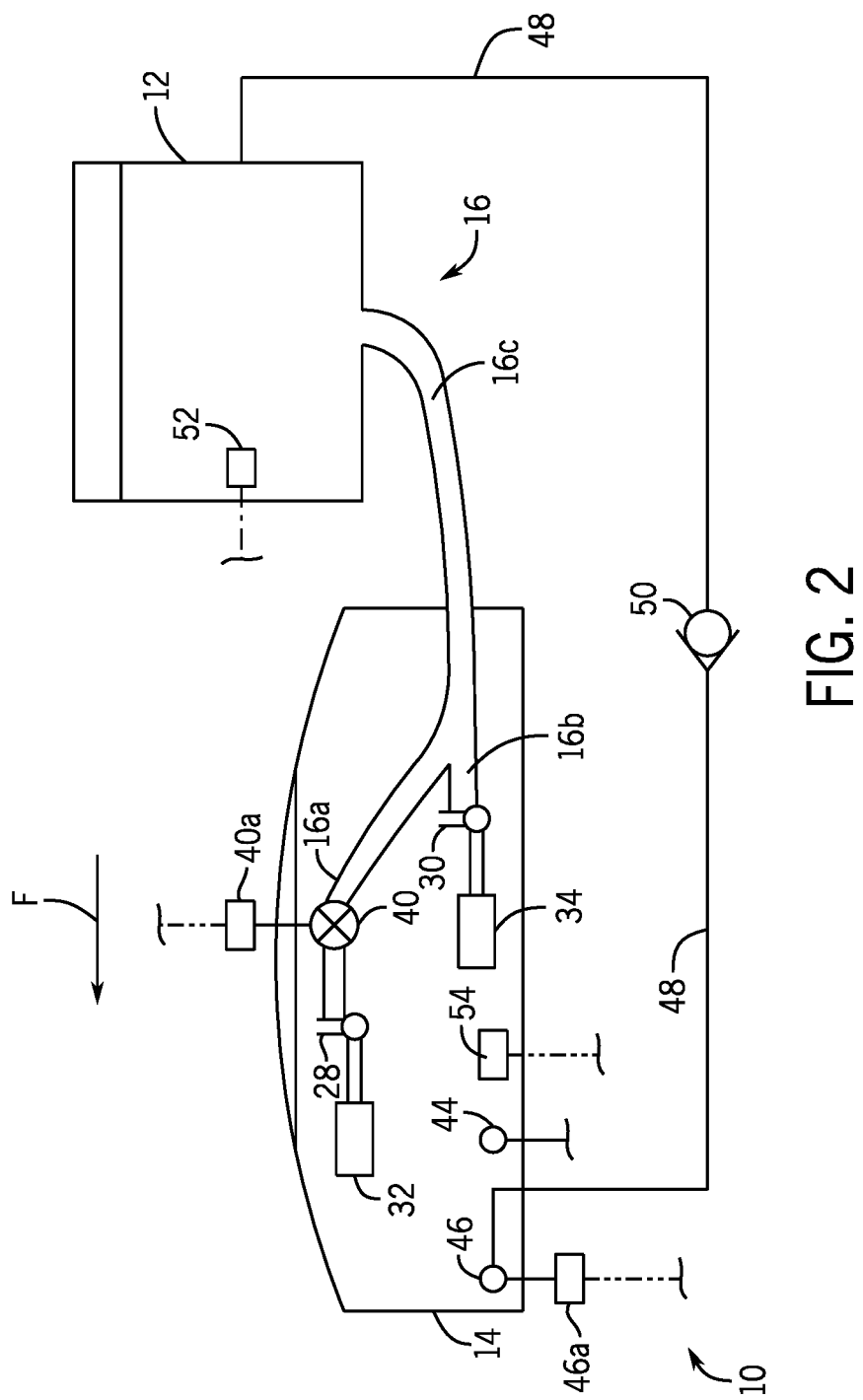
FIG. 2 is a schematic side view of a portion of the aircraft fuel level control system of FIG. 1.

Referring now to the drawings, wherein like numerals refer to like parts throughout the several views, FIG. 1 illustrates an aircraft fuel level control system 10 for an aircraft A according to one embodiment of the present disclosure. A forward direction of travel for the aircraft A is indicated by arrow F. More particularly, the control system 10 of FIG. 1 includes an upper tank or upper fuel tank 12 for storing fuel, a lower tank or lower fuel tank 14 for storing fuel, and a fuel transfer line 16 connecting the upper tank 12 to the lower tank 14. As best shown in FIG. 2, the lower tank 14 is disposed below the upper tank 12 so as to enable gravity to transfer fuel from the upper tank 12 to the lower tank 14 as will be described in more detail below. The fuel level control system 10 provides fuel transfer from the upper tank 12 to the lower tank 14 by gravity allowing an appropriate fuel consumption sequence, which accomplishes desirable center of gravity movement while providing fuel pressure isolation by disconnecting hydraulic pressure between the upper tank 12 and the lower tank 14.

In the illustrated embodiment, the upper tank 12 is located within a fuselage 18 of the aircraft A and the lower tank 14 is disposed in the fuselage 18 and the wing portions 20 of the aircraft A. While the upper tank 12 of the illustrated embodiment is located only within the fuselage 18 of the aircraft, it is to be appreciated that the upper tank 12 could be provided at any location within the aircraft A and need not be limited to the location in the fuselage 18 of the illustrated embodiment provided the upper tank 12 is provided at a higher elevation in the aircraft A than the lower tank 14. For example, the upper tank 12 could be provided in one or more of a vertical tail, a horizontal tail, one or both of the wing portions 20 of the aircraft A, another wing when more than one wing is provided on the aircraft A, etc. Likewise, it is to be appreciated that the lower tank 14 can be provided at any location within the aircraft A, and need not be limited to the location in the fuselage 18 and the wing portions 20 of the illustrated embodiment, provided the lower tank 14 is provided at lower elevation in the aircraft A than the upper tank 12. For example, the lower tank 14 can be provided in one or more of a vertical tail, a horizontal tail, one or both of the wing portions 20 of the aircraft A, another wing when more than one wing is provided on the aircraft A, etc.

Returning to the illustrated embodiment, the upper tank 12 is disposed in the fuselage 18 rearwardly of the lower tank 14, though this is not required. Additional wing tanks (not shown in FIG. 1) can be disposed within the wing portions 20 and such wing tanks can be fluidly connected to the lower tank 14, if desired. As will be described in more detail below, fuel transfer from the upper tank 12 to the lower tank 14 is accomplished by gravity through the fuel transfer line 16.

With additional reference to FIG. 2, the fuel level control system 10 further includes an upper fuel transfer line outlet 28 in the lower tank 14 and in fluid communication with the upper tank 12 via the fuel transfer line 16. In the embodiment of FIG. 1, two upper fuel transfer line outlets 28 are provided in the fuel level control system 10, though this is not required. The use of two or more upper fuel transfer line outlets 28 can be to better facilitate distribution of fuel due to shape limitations of the lower tank 14 and/or to enhance redundancy in the fuel level control system 10. The fuel level control system 10 could employ any number of upper fuel transfer line outlets 28 as will be understood and appreciated by those skilled in the art.

The fuel level control system 10 further includes a lower fuel transfer line outlet 30 in the lower tank and in fluid communication with the upper tank 12 via the fuel transfer line 16. In the illustrated embodiment, the lower fuel transfer line outlet 30 is disposed lower than or beneath the upper fuel transfer line outlet 28 and within the lower fuel tank 14. Additionally, in the illustrated embodiment, only a single lower fuel transfer line outlet 30 is provided; however, the fuel level control system 10 could employ any number of lower fuel transfer line outlets 30 as will be understood and appreciated by those skilled in the art.

The control system 10 can further include an upper line outlet valve 32 associated with each upper fuel transfer line outlet 28 for opening and closing the upper fuel transfer line outlet 28. In the embodiment of FIG. 1, the control system 10 includes two upper line outlet valves 32 each associated with a respective upper fuel transfer line outlet 28 and each of the valve 32 is an upper line outlet float valve, though the valve 32 can be any valve that opens or closes the outlet 28 based on a fuel level in the lower tank 14. In embodiments where only one upper fuel transfer line outlet 28 is used, a single upper line outlet valve 32 can be associated with the single upper fuel transfer line outlet 28. Each of the valves 32 can have a fuel actuation level associated therewith such that when fuel in the lower tank 14 is below the fuel actuation level the valve 32 opens. In one embodiment, the fuel actuation level associated with each of the upper line outlet valves 32 is the same (i.e., both upper line outlet valves 32 of the illustrated embodiment open together when fuel in the lower tank 14 is below the fuel actuation level for the upper line outlet valves 32).

The control system 10 further includes a lower line outlet valve 34 associated with the lower fuel transfer line outlet 30 for opening and closing the lower fuel transfer line outlet 30. In the embodiment of FIG. 1, the lower line outlet valve 34 is a lower line outlet float valve, though the valve 34 can be any valve that opens or closes the lower fuel transfer line outlet 30 based on a fuel level in the lower tank 14. The lower line outlet valve 34 can have a fuel actuation level associated therewith such that when fuel in the lower tank 14 is below the fuel actuation level associated with the valve 34, the valve 34 opens. Due to the relative heights at which the upper line outlet valves 32 are positioned within the lower tank 14 compared to the height of the lower line outlet valve 34, the actuation level for the upper line outlet valves 32 is at a higher fuel level in the lower tank 14 as compared to the actuation level for the lower line outlet valve 34.

The control system 10 of the illustrated embodiment further includes a control shutoff valve 40 disposed on the fuel transfer line 16 for selectively limiting flow through the fuel transfer line 16. More particularly, in the illustrated embodiment, the control shutoff valve 40 is fluidly disposed between the upper fuel transfer line outlets 28 and the upper fuel tank 12. In the illustrated embodiment, the fuel transfer line 16 includes an upper branch line portion 16a on which the upper fuel transfer line outlets 28 are disposed and a lower branch line portion 16b on which the lower fuel transfer line outlet 30 is disposed. As shown, the control shutoff valve 40 can be disposed on the upper branch line portion 16a for selectively limiting flow through the upper branch line portion 16a. As will be described in more detail below, the control shutoff valve 40 can be commanded closed to prevent fuel flow through the upper branch line portion 16a when the aircraft A is forward loaded above a predetermined threshold such that fuel is prevented from passing through the upper fuel transfer line outlets 28 in the lower tank 14 even when a fuel level in the lower tank 14 is below the actuation level of the upper line outlet valve 32 associated with the upper fuel transfer line outlets 28.

More particularly, in the illustrated embodiment, the fuel transfer line 16 can include a main branch 16c in addition to the upper branch line 16a and the lower branch line 16b. Further, the fuel transfer line 16 can include additional branch portions 16d, 16e to fluidly connect each of the pair of upper fuel transfer line outlets 28 to the upper branch line portion 16a and thereby to the main branch 16c. In particular, the control shutoff valve 40 is fluidly disposed downstream of the lower fuel transfer line outlet 30 from the upper fuel tank 12. More specifically, the control shutoff valve 40 is fluidly disposed on the upper branch line portion 16a which is fluidly disposed downstream of the lower branch line portion 16b as best shown in FIG. 2.

The control system 10 can further include a primary pump 44 disposed in and/or fluidly connected to the lower tank 14 for drawing fuel from the lower tank 14 to feed fuel to the engines that power the aircraft A. The control system 10 can also include an auxiliary pump 46 disposed in and/or fluidly connected to the lower tank 14 for drawing fuel from the lower tank 14 to transfer fuel to the upper tank 12. In particular, as shown in FIG. 1, the auxiliary pump 46 can be fluidly connected to the upper tank 12 via an auxiliary fuel line 48 that extends from the lower tank 14, and particularly from the auxiliary pump 46, to the upper tank 12. Optionally, a back stop flow preventer 50 can be disposed on the auxiliary fuel line 48. An auxiliary pump controller 46a can be associated with the auxiliary pump 46 for control thereof. Likewise, a valve controller 40a can be associated with the control shutoff valve 40 for control thereof.

Also, fuel level sensors 52, 54 can be disclosed, respectively, in the upper tank 12 and the lower tank 14. Each of the sensors 52, 54, the valve controller 40a and the auxiliary pump controller 46a can be electronically connected to one or more electronic control units 56. Actuators 58, 60 can also be electronically connected to the electronic control unit 56 for manual operation by a pilot of the aircraft A. In particular, the actuator 58 can be a cockpit controller 58 electronically connected to the control shutoff valve 40 through the electronic control unit 56 for enabling pilot actuation of the control shutoff valve 40. The actuator 60 can be a cockpit auxiliary pump controller 60 that is electronically connected to the auxiliary pump 46 through the electronic control unit 56 for enabling pilot actuation of the auxiliary pump 46.

In operation, the control shutoff valve 40 can be closed to prevent fluid flow from the upper fuel tank 12 through the upper fuel transfer line outlet 28 even when a fuel level in the lower fuel tank 14 is below the actuation level at which the upper line outlet valve 32 is open. This state could be used to maintain more fuel in the upper tank 12 and thereby more weight toward or to the aft portion the aircraft A at which the upper tank 12 is disposed. This could be desirable when the passenger and/or cargo loading results in the center of gravity being forward on the aircraft A. In this instance, the control valve 40 can be commanded closed by a pilot of the aircraft A via the cockpit controller 58. Accordingly, fuel does not transfer from the upper tank 12 to the lower tank 14 despite the upper line outlet valve 32 being opened (i.e., the fuel level is below the actuation level of the upper line outlet valve 32) until fuel is transferred from the upper tank 12 to the lower tank 14 through the lower fuel transfer line outlet 30 when the lower line outlet valve 34 is opened.

If necessary or desired to transfer fuel from the lower tank 14 to the upper tank 12, such as prior to takeoff of the aircraft A, the auxiliary pump 46 can be actuated via the cockpit auxiliary pump controller 60. If passenger and/or cargo loading results in the center of gravity for aircraft A being in the aft direction, the control valve 40 can be commanded open by a pilot of the aircraft A via the cockpit controller 58. In this case, fuel transfers from the upper tank 12 to the lower tank 14, including through the upper fuel transfer line outlet 28 when the upper line outlet float valve 32 is opened, which occurs when fuel in the lower tank 14 is below the actuation level for opening the valve 32. Optionally, the fuel tanks 12, 14 can each be filled to a desired level (e.g., to a full level) and the control shutoff valve 40 could be closed to select the order in which fuel from each of the fuel tanks 12, 14 is consumed. Also, optionally and not shown, each fuel tank 12, 14 can have separate refilling provisions (i.e., each tank 12 and 14 can be independently filled) or both tanks could be filled from the upper tank 12. Accordingly, there are several options for establishing the initial fuel levels in each of the upper and lower fuel tanks 12, 14.

Figure 3:
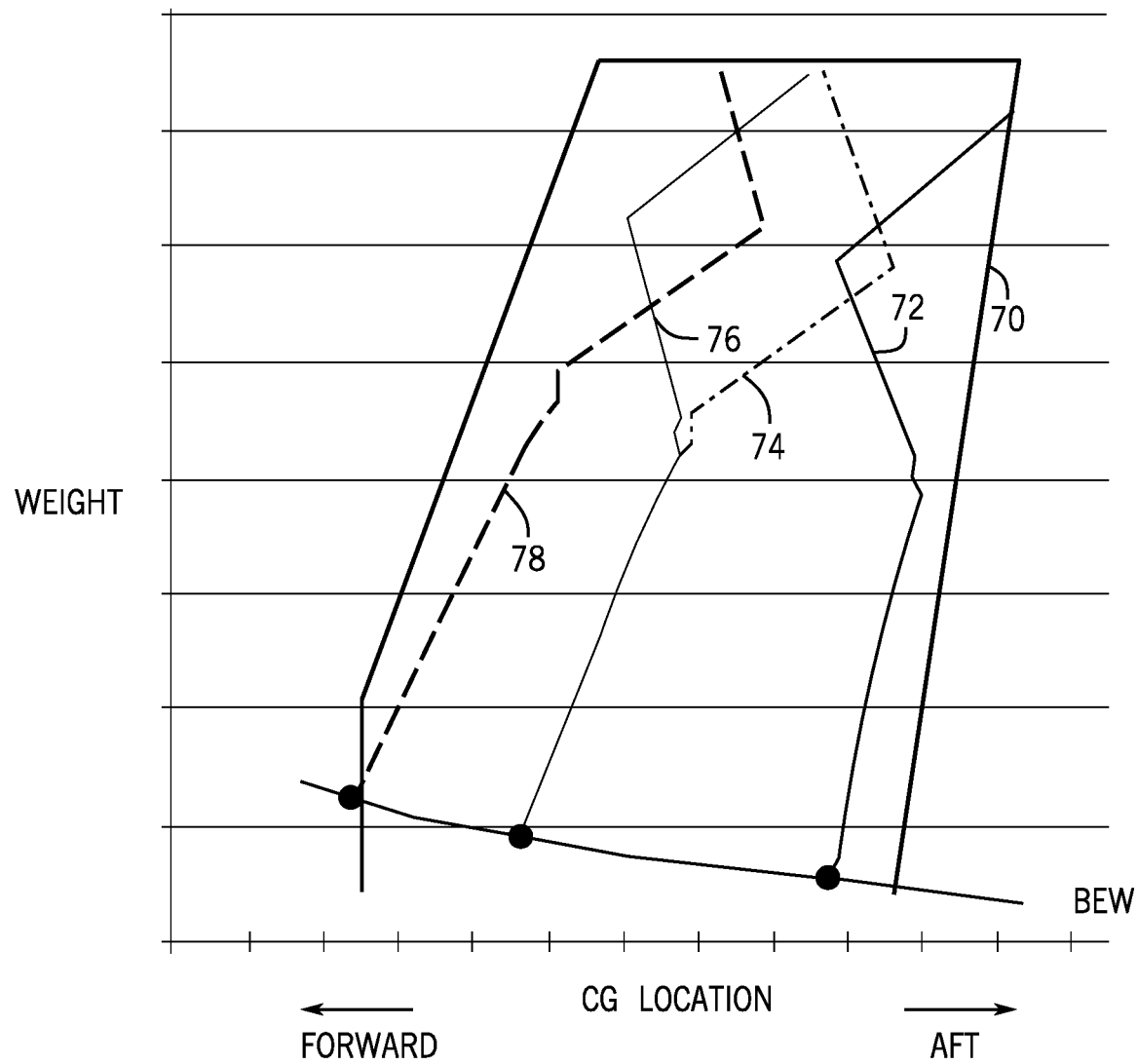
FIG. 3 is a graph depicting various fuel transfer scenarios based on a center of gravity location on an aircraft according to one aspect.

Advantageously, use of the control shutoff valve 40 within the control system 10 can maintain the aircraft A within a weight and center of gravity envelope. With reference to FIG. 3, an example weight and center of gravity envelope is illustrated with the envelope indicated by reference 70. Line 72 illustrates an example wherein the aircraft A is loaded toward the aft direction near the edge of the envelope 70. In this scenario, the control shutoff valve 40 can be controlled to the open state wherein fuel flow from the upper tank 12 to the lower tank 14 is permitted through the upper fuel transfer line outlets 28 when fuel within the lower tank 14 falls below the actuation level for the upper line outlet valves 32 to open. Line 74 illustrates an example wherein the aircraft A is loaded relatively evenly between the forward and aft directions and the control shutoff valve 40 is commanded to the closed position wherein fuel is prevented from passing through the upper fuel transfer line outlets 28 even when the upper line outlet valves 32 are open, which causes loading to veer toward the aft direction as fuel is depleted. Line 76 represents the same loading as line 74 (i.e., center loading between the forward and aft directions) but the control shutoff valve 40 is commanded to the open state wherein fuel flow from the upper tank 12 to the lower tank 14 is permitted through the upper fuel transfer line outlets 28 when fuel in the lower tank 14 is below the actuation level at which the upper line outlet valves 32 open. Line 78 represents an example wherein the aircraft A is loaded toward the forward direction near an edge of the envelope 70 and the control shutoff valve 40 is commanded to the closed position wherein fuel is not prevented to pass from the upper tank 12 to the lower tank 14 through the upper fuel transfer line outlets 28 even when fuel in the lower tank 14 is below the actuation level at which the upper line outlet float valves 32 open.

Figure 4:
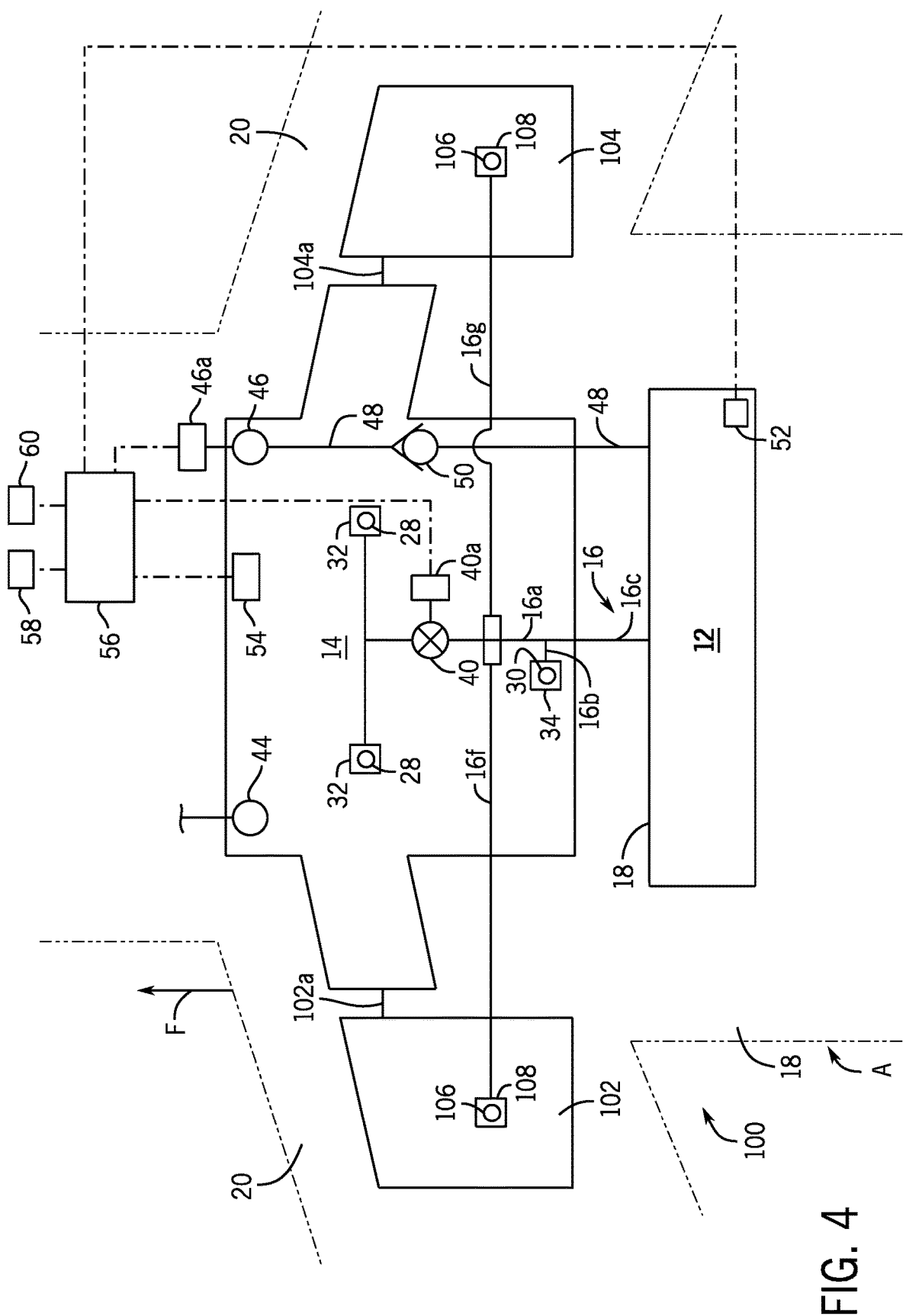
FIG. 4 is a schematic top view of an aircraft fuel level control system according to another aspect of the present disclosure.

With reference now to FIG. 4, an aircraft fuel level control system 100 will be described with reference to another exemplary embodiment. In particular, the control system 100 of FIG. 4 can be the same as the control system 10 except as indicated below. Accordingly, like reference numerals are used for like components in the control system 100 of FIG. 4 as in the control system 10 of FIGS. 1 and 2. In addition to the upper tank 12 and lower tank 14, the control system 100 can include wing fuel tanks 102, 104 that are fluidly connected to the lower tank 14 as indicated at 102a, 104a as is known and understood by those skilled in the art. In this regard, though not illustrated, the wing tanks 102, 104 and fluid connections 102a, 104a with the lower tank 14 can be included in the system 10 of FIG. 1, though not illustrated in FIG. 1.

However, unlike the system 10 of FIG. 1, the control system 100 additionally includes a wing upper fuel transfer line outlet 106 in the wing tank 102. In particular, two wing upper fuel transfer line outlets 106 are provided with one in each of the wing tanks 102 and 104, though this is not required. The wing upper fuel transfer line outlets 106 are in fluid communication with the upper tank 12 via the fuel transfer line 16 and the wing upper fuel transfer line outlets 106. A wing upper line outlet valve 108 is associated with each of the wing upper fuel transfer line outlets 106 for opening and closing the wing upper fuel transfer line outlets 106 when fuel in the lower tank 14 is below the actuation level for the upper line outlet valves 108.

The wing upper fuel transfer line outlets 106 are both disposed on the upper branch line portion 16a of the fuel transfer line 16. In particular, wing branch portions 16f, 16g can fluidly connect the fuel transfer line 16 and the upper tank 12 to the wing tanks 102, 104 and can particularly extend from the upper branch line portion 16a downstream of the lower branch line portion 16b but upstream of the control shutoff valve 40 such that the control shutoff valve 40 does not affect fluid flow through the wing branch portion 16f, 16g regardless of whether the control shutoff valve 40 is in a closed state or an open state. In alternative embodiments, the control shutoff valve 40 could be disposed upstream of the wing branch portion 16f, 16g on the upper branch line portion 16a such that closing of the control shutoff valve in such an embodiment would prevent fuel flow from the upper tank 12 to the wing tanks 102, 104 via the wing upper tank fuel transfer line outlets 106.

Figure 5:
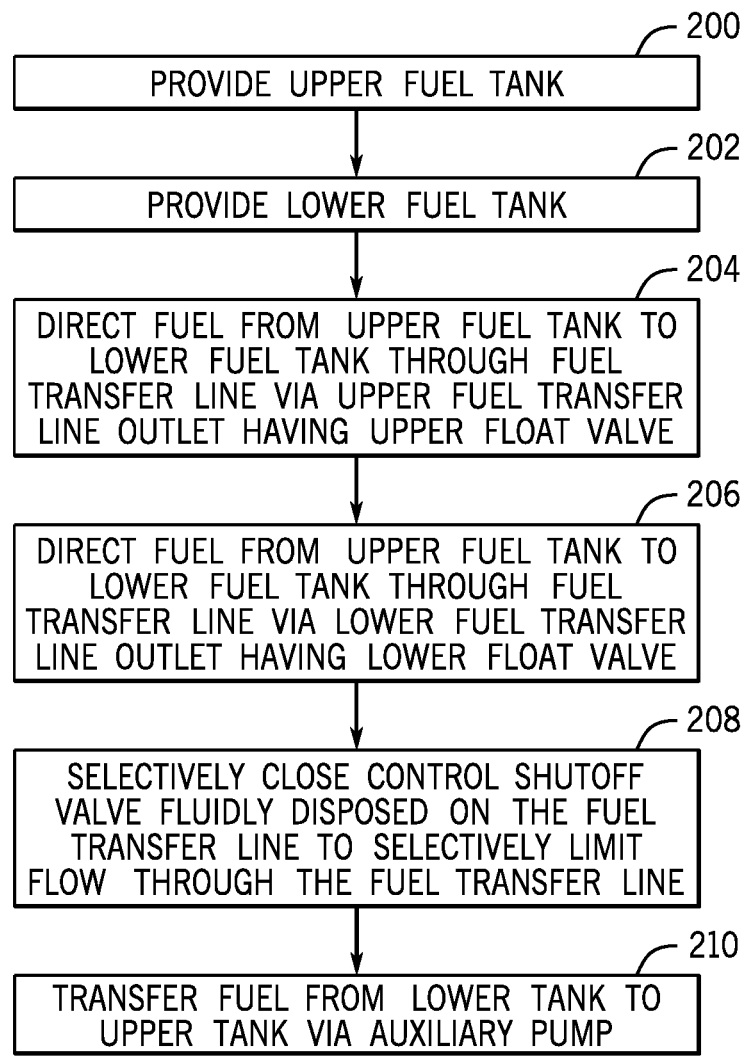
FIG. 5 is a process flow diagram of a fuel level control method for an aircraft according to one aspect of the present disclosure.

With reference now to FIG. 5, a fuel level control method for an aircraft will be described. In particular, the method of FIG. 5 will be described in association with the aircraft fuel level control system 10 of FIGS. 1 and 2, though this is not required, and it is to be appreciated that the method could be used with other fuel level control systems. As shown, at 200, the method includes providing the upper tank 12 for storing fuel and, at 202, providing the lower tank 14 for storing fuel that is disposed below the upper tank 12. As already described herein, the lower tank 14 is fluidly connected to the upper tank 12 by the fuel transfer line 16.

At 204, fuel from the upper tank 12 is directed to the lower tank 14 through the fuel transfer line 16 via the upper fuel transfer line outlets 28 having upper line outlet valves 32. At 206, fuel from the upper tank 12 is directed to the lower tank 14 through the fuel transfer line 16 via the lower fuel transfer line outlets 30 having lower line outlet valves 34. At 208, the control shutoff valve 40 is selectively closed to selectively limit flow through the fuel transfer line 16, wherein the control shutoff valve 40 is disposed on the fuel transfer line 16 as described hereinabove. In particular, the control shutoff valve 40 is fluidly disposed between the upper fuel transfer line outlets 28 and the upper tank 12 for preventing fuel flow through the upper fuel transfer line outlets 28 when the control shutoff valve 40 is closed. When desired, as shown at 210, fuel from the lower tank 14 can be transferred to the upper tank 12 via the auxiliary fuel line 48 by operation of the auxiliary pump 46 disposed in the lower tank 14.

It will be appreciated that variations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A fuel level control system for an aircraft, comprising:
an upper tank for storing fuel;
a lower tank for storing fuel, the lower tank being disposed below the upper tank;
a fuel transfer line connecting the upper tank to the lower tank;
an upper fuel transfer line outlet in the lower tank and in fluid communication with the upper tank via the fuel transfer line, wherein an upper line outlet valve is associated with the upper fuel transfer line outlet for opening and closing the upper fuel transfer line outlet;
a lower fuel transfer line outlet in the lower tank and in fluid communication with the upper tank via the fuel transfer line, wherein a lower line outlet valve is associated with the lower fuel transfer line outlet for opening and closing the lower fuel transfer line outlet; and
a control shutoff valve disposed on the fuel transfer line for selectively limiting flow through the fuel transfer line,
wherein the fuel transfer line includes an upper branch line portion on which the upper fuel transfer line outlet is disposed and a lower branch line portion on which the lower fuel transfer line outlet is disposed, and wherein the control shutoff valve is disposed on the upper branch line portion for selectively limiting flow through the upper branch line portion.

2. The fuel level control system of claim 1 wherein the control shutoff valve is commanded closed to prevent fuel flow through the upper branch line portion to prevent fuel from passing through the upper fuel transfer line outlet in the lower tank even when a fuel level in the lower tank is below an actuation level of the upper fuel transfer line outlet.

3. The fuel level control system of claim 1 further including a cockpit controller electronically connected to the control shutoff valve for enabling pilot actuation of the control shutoff valve.

4. The fuel level control system of claim 1, wherein the upper tank is disposed in a fuselage of the aircraft rearward of the lower tank.

5. The fuel level control system of claim 1 further including a cockpit controller electronically connected to the control shutoff valve for enabling pilot actuation of the control shutoff valve.

6. The fuel level control system of claim 5 further including:
an auxiliary pump disposed in and/or fluidly connected to the lower tank for drawing fuel from the lower tank to transfer fuel to the upper tank.

7. The fuel level control system of claim 6 further including a cockpit auxiliary pump controller electronically connected to the auxiliary pump for enabling pilot actuation of the auxiliary pump.

8. The fuel level control system of claim 1 further including:
an auxiliary pump disposed in and/or fluidly connected to the lower tank for drawing fuel from the lower tank to transfer fuel to the upper tank.

9. The fuel level control system of claim 8 further including a cockpit auxiliary pump controller electronically connected to the auxiliary pump for enabling pilot actuation of the auxiliary pump.

10. A fuel level control system for an aircraft, comprising:
an upper tank for storing fuel;
a lower tank for storing fuel, the lower tank being disposed below the upper tank;
a fuel transfer line connecting the upper tank to the lower tank;
an upper fuel transfer line outlet in the lower tank and in fluid communication with the upper tank via the fuel transfer line, wherein an upper line outlet valve is associated with the upper fuel transfer line outlet for opening and closing the upper fuel transfer line outlet;
a lower fuel transfer line outlet in the lower tank and in fluid communication with the upper tank via the fuel transfer line, wherein a lower line outlet valve is associated with the lower fuel transfer line outlet for opening and closing the lower fuel transfer line outlet; and a control shutoff valve disposed on the fuel transfer line for selectively limiting flow through the fuel transfer line;

a wing tank for storing fuel; and a wing upper fuel transfer line outlet in the wing tank and in fluid communication with the upper tank via through the fuel transfer line, wherein a wing upper line outlet valve is associated with the wing upper fuel transfer line outlet for opening and closing the wing upper fuel transfer line outlet.

11. The fuel level control system of claim 10 wherein the fuel transfer line includes an upper branch line portion on which the upper fuel transfer line outlet and the wing upper fuel transfer line outlet are both disposed and a lower branch line portion on which the lower fuel transfer line outlet is disposed, and wherein the control shutoff valve is disposed on the upper branch line portion for selectively limiting flow through only the upper fuel transfer line outlet.

12. An aircraft fuel level control system, comprising:
an upper fuel tank;
a lower fuel tank disposed below the upper fuel tank;
a fuel transfer line fluidly connecting the upper fuel tank and the lower fuel tank, the fuel transfer line including an upper branch line portion and a lower branch line portion, the fuel transfer line having an upper fuel transfer line outlet in the lower fuel tank disposed on the upper branch line portion with an upper line outlet valve for opening and closing the upper fuel transfer line outlet and having a lower fuel transfer line outlet in the lower fuel tank disposed on the lower branch line portion with a lower line outlet valve for opening and closing the lower fuel transfer line outlet; and
a control shutoff valve disposed on the upper branch line portion and fluidly disposed between the upper fuel transfer line outlet and the upper fuel tank.

13. The aircraft fuel level control system of claim 12 wherein the control shutoff valve on the upper branch line portion is fluidly disposed downstream of the lower fuel transfer line outlet from the upper fuel tank.

14. The aircraft fuel level control system of claim 12 wherein the control shutoff valve is closed to prevent fluid flow from the upper fuel tank through the upper fuel transfer line outlet even when a fuel level in the lower fuel tank is below an actuation level at which the upper line outlet valve is open.

15. The aircraft fuel level control system of claim 13 further including:

a primary pump disposed in and/or fluidly connected to the lower tank for drawing fuel from the lower tank to power the aircraft; and an auxiliary pump disposed in and/or fluidly connected to the lower tank for drawing fuel from the lower tank to transfer fuel to the upper tank.

16. The aircraft fuel level control system of claim 15 further including:

a wing fuel tank; and wherein the fuel transfer line has a wing upper fuel transfer line outlet in the wing tank with a wing valve for opening and closing the wing upper fuel transfer line outlet, and wherein the control shutoff valve is fluidly disposed downstream of the wing upper fuel transfer line outlet.

17. A fuel level control method for an aircraft, comprising:

providing an upper tank for storing fuel;

providing a lower tank for storing fuel that is disposed below the upper tank, the lower tank fluidly connected to the upper tank by a fuel transfer line including an upper branch line portion and a lower branch line portion;

directing fuel from the upper tank to the lower tank through the upper branch line portion of the fuel transfer line via an upper fuel transfer line outlet having an upper line outlet valve;

directing fuel from the upper tank to the lower tank through the lower branch line portion of the fuel transfer line via a lower fuel transfer line outlet having a lower line outlet valve; and selectively closing a control shutoff valve disposed on the upper branch line portion fluidly disposed on the fuel transfer line to selectively limit flow through the fuel transfer line.

18. The fuel level control method of claim 17 wherein the control shutoff valve on the upper branch line portion is fluidly disposed between the upper fuel transfer line outlet and the upper tank for preventing fuel flow through the upper fuel transfer line outlet when the control shutoff valve is closed.

19. The fuel level control method of claim 18 further including:

transferring fuel from the lower tank to the upper tank via an auxiliary fuel line by operation of an auxiliary pump disposed in the lower tank.

* * * * *